(12) United States Patent
Spellicy et al.

(10) Patent No.: US 8,807,767 B2
(45) Date of Patent: Aug. 19, 2014

(54) CORNER CUBE RETROREFLECTOR DEVICE, METHOD, AND APPARATUS

(71) Applicant: IMACC, LLC, Round Rock, TX (US)

(72) Inventors: Robert L. Spellicy, Round Rock, TX (US); Mark A. Sloss, Austin, TX (US)

(73) Assignee: IMACC, LLC, Round Rock, TX (US)

( * ) Notice: Subject to any disclaimer, the term of this patent is extended or adjusted under 35 U.S.C. 154(b) by 0 days.

(21) Appl. No.: 14/150,121

(22) Filed: Jan. 8, 2014

(65) Prior Publication Data

US 2014/0116628 A1 May 1, 2014

Related U.S. Application Data

(62) Division of application No. 13/105,033, filed on May 11, 2011, now Pat. No. 8,651,674.

(60) Provisional application No. 61/356,329, filed on Jun. 18, 2010.

(51) Int. Cl.
*G02B 5/122* (2006.01)

(52) U.S. Cl.
CPC .................................. *G02B 5/122* (2013.01)
USPC .......................................... 359/529; 359/896

(58) Field of Classification Search
CPC ...................................................... G02B 5/122
USPC ..................................................... 359/529, 836
See application file for complete search history.

(56) References Cited

U.S. PATENT DOCUMENTS

| 4,319,804 | A | | 3/1982 | Lipkins |
| 5,122,901 | A | | 6/1992 | Bleier |
| 5,335,111 | A | * | 8/1994 | Bleier ........................... 359/529 |
| 2007/0035836 | A1 | | 2/2007 | Lyons |

* cited by examiner

*Primary Examiner* — James Phan
(74) *Attorney, Agent, or Firm* — Mark E. Scott; Conley Rose, PC

(57) ABSTRACT

Corner cube retroreflector apparatus. At least one of the illustrative embodiments is an apparatus with three plates, each with a face, each adjoined substantially perpendicular and substantially normal to each other; an alignment device coupled to the first plate face with an adjustable plate substantially parallel to the first plate face and movably coupled to the first plate, and adjustable with respect to an angular relationship with the second and third plates; a second alignment device coupled to the second plate face with an adjustable plate substantially parallel to the second plate face and movably coupled to the second plate, and adjustable with respect to an angular relationship with the first and third plates; attachment appurtenances on both alignment devices which holds components of the retroreflective device onto the alignment devices during assembly; and apertures through which portions of the retroreflective device are accessible during assembly.

9 Claims, 6 Drawing Sheets

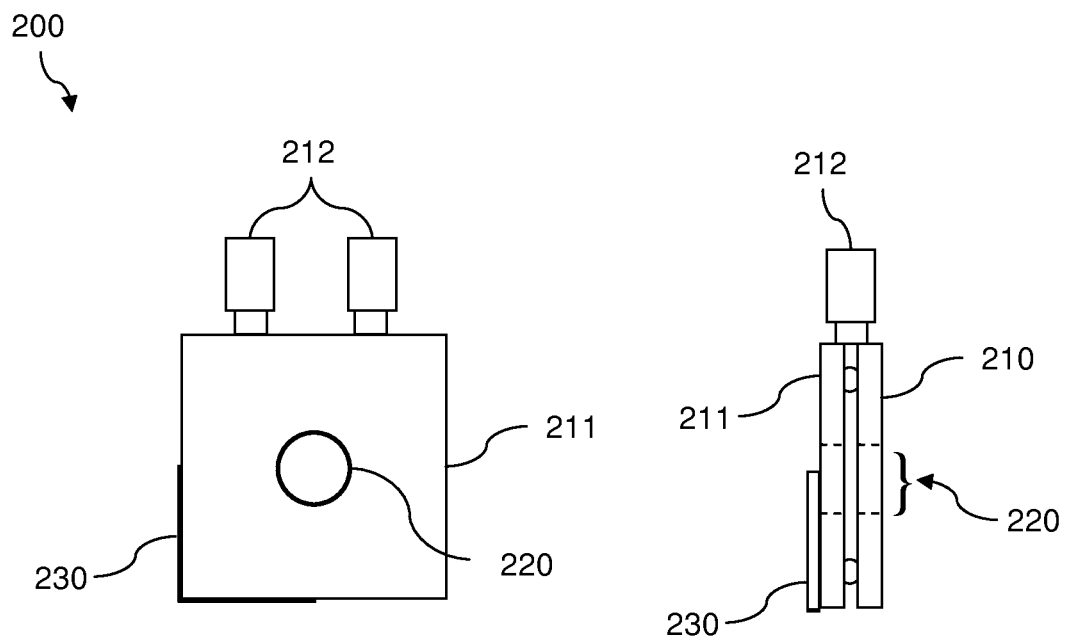
FIG. 2A
FIG. 2B
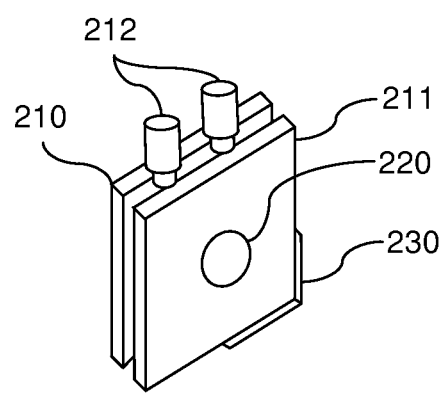
FIG. 2C

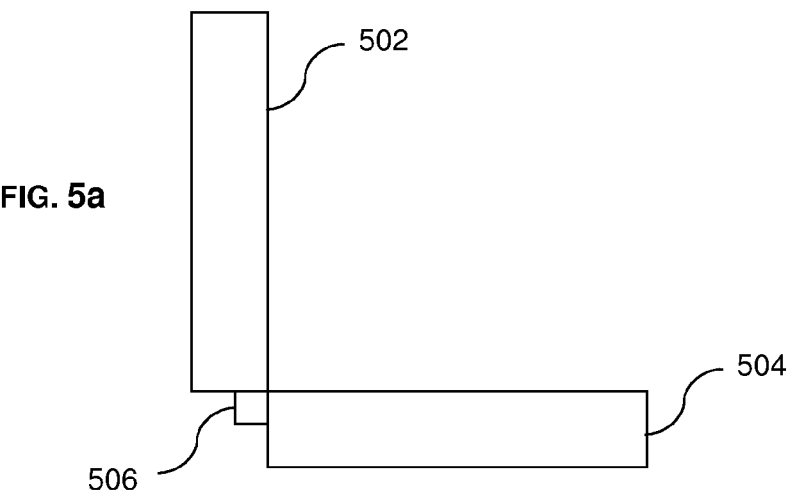
FIG. 5a
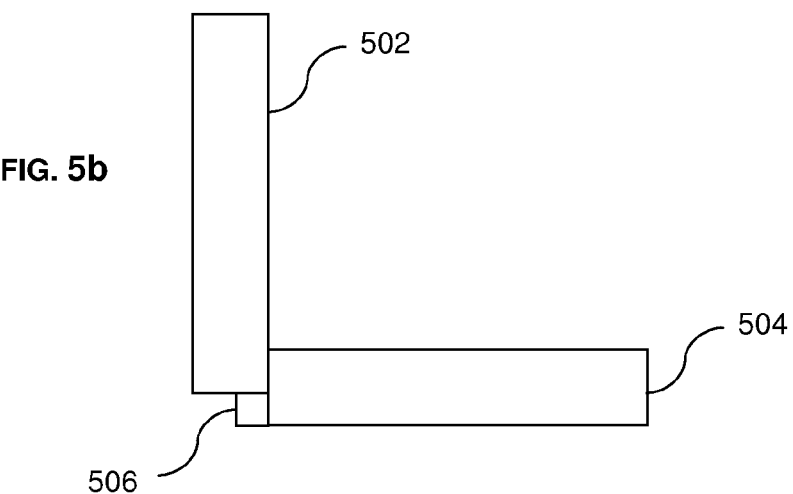
FIG. 5b
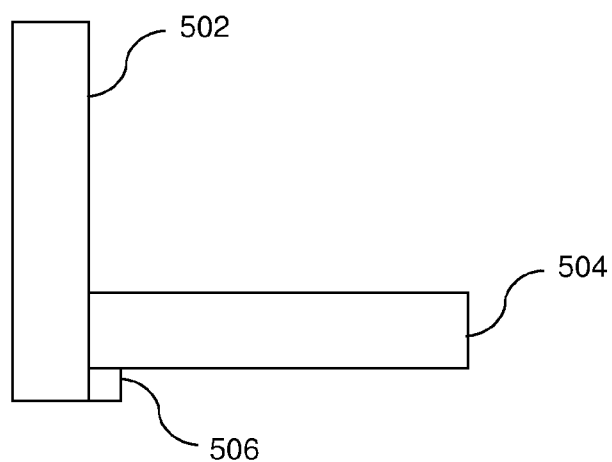
FIG. 5c
FIG. 5

CORNER CUBE RETROREFLECTOR DEVICE, METHOD, AND APPARATUS

CROSS-REFERENCE TO RELATED APPLICATIONS

This application is a divisional of U.S. application Ser. No. 13/105,033 filed May 11, 2011, now U.S. Pat. No. 8,651,674, titled "Corner Cube Retroreflector Device, Method, and Apparatus," the disclosure of which is incorporated herein by reference as if reproduced in full below. The Ser. No. 13/105,033 application claims benefit of U.S. Provisional Application No. 61/356,329, filed Jun. 18, 2010, titled "Corner Cube Retroreflector Device, Method, and Apparatus," the disclosure of which is incorporated herein by reference as if reproduced in full below.

BACKGROUND

Retroreflecting devices provide the ability to reflect light back toward the light source. Retroreflecting devices may be utilized in a variety of applications where it is desirable to transmit and subsequently return a beam of light. The properties of retroreflecting devices may facilitate substantial latitude with respect to the alignment of the retroreflecting device and the angle of approach of the incident beam, which may facilitate and/or simplify alignment of a retroreflecting device and the related incident beam. Retroreflecting devices may be a corner cube mirror or may be a plurality of corner cube mirrors combined as a retroreflecting unit. Assembling corner cube mirrors from multiple components may require accurate and precise alignment, with respect to the angle at which the components relate. The method of attaching the components of corner cube mirrors to one another may also be important, as some methods of attachment may alter the alignment of the components during or after the attachment process.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 2A is a front view of an alignment device, according to an embodiment of the disclosure.

FIG. 2B is a side view of an alignment device, according to an embodiment of the disclosure.

FIG. 2C is a perspective view of an alignment device, according to an embodiment of the disclosure.

FIG. 5 illustrates additional views of portions of corner cube mirror assemblies, according to embodiments of the disclosure.

FIG. 5A is a side view of a corner cube mirror assembly, according to an embodiment of the disclosure.

FIG. 5B illustrates a view of a portion of a corner cube mirror assembly, according to an embodiment of the disclosure.

FIG. 5C illustrates a view of a portion of a corner cube mirror assembly, according to an embodiment of the disclosure.

DETAILED DESCRIPTION

Figure 1A:
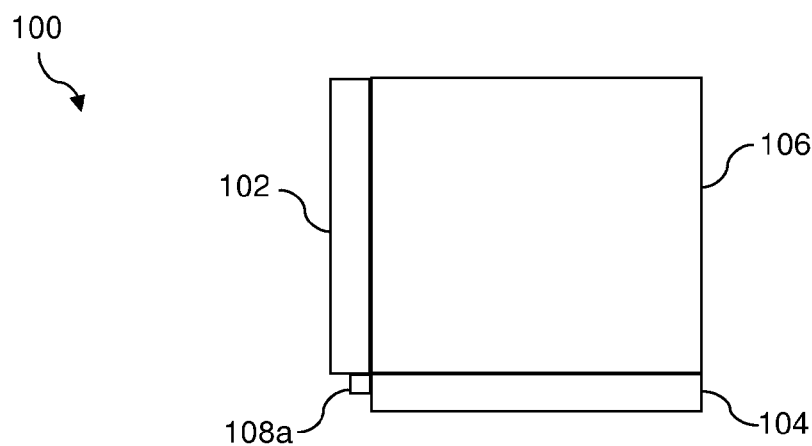
FIG. 1A is a side view of a corner cube mirror assembly, according to an embodiment of the disclosure.

It should be understood at the outset that although illustrative implementations of one or more embodiments are illustrated below, the disclosed systems and methods may be implemented using any number of techniques, whether currently known or developed in the future. The disclosure should in no way be limited to the illustrative implementations, drawings, and techniques illustrated below, but may be modified within the scope of the appended claims along with their full scope of equivalents.

A method, a device and an apparatus are taught that facilitate assembling corner cube mirror assemblies (CCM). The disclosure teaches a method of assembly that provides improved attachment of the mirrors that comprise a CCM, one to another, by virtue of employing additional pieces of material, referred to herein as supporting members, that may be the same or similar to the material of construction of the mirror substrate. The supporting members may provide increased contact surface area between the mirrors and/or may facilitate improved attachment of the components of the mirror assembly. In addition, the supporting members may provide a bracing effect related to the leverage imparted onto the structure, which may further strengthen the overall structure of the corner cube mirrors.

The method also teaches observing and monitoring the alignment of the individual mirrors that makeup the CCM during the assembly process, thereby facilitating adjustment to a desired alignment. An image may be imposed onto the faces of the three mirrors of the CCM while they are in the jig. The reflected image returned from the mirrors may be observed by an operator. Movable stages with mirrors held in place onto them may then be adjusted until the observed image is acceptable.

The device teaches a retroreflecting device comprising three reflective surfaces adjoined perpendicular to one another with supporting members adhered to them, wherein the supporting members are of substantially the same material of construction as the substrates of the reflective surfaces and have a cross-sectional shape that is complimentary to the edges of the reflective surfaces.

The apparatus teaches holding the components of the assembly in a frame or jig that enables adjustable alignment of two of the three mirrors of the assembly. The apparatus comprises positioning fixtures to facilitate initial placement of the mirrors of the CCM, such that they are normal to one another, as well as adjustable stages to provide more precise alignment of the mirrors of the assembly.

In the present disclosure, the term "normal" is used to describe a surface that is in a position that is at approximately a 90 degree angle to another surface. In addition, the term "perpendicular" is used to describe a surface that is more closely aligned to perfectly perpendicular (e.g. exactly ninety degrees) to another surface. While not wishing to be limited by theory, it is understood by one of ordinary skill in the art that it is virtually impossible to achieve perfectly perpendicular alignment. Herein, the term perpendicular will be used to describe a relationship of two surfaces that sufficiently approaches perfect perpendicularity so as to achieve a desired result. Also, the term "appurtenance" is used to describe a variety of mechanisms and/or methods of holding components of the CCM in place during the alignment, assembly, and/or adhesive curing steps. Appurtenances may include physical mechanisms, adhesives, forces (e.g. gravity, vacuum, centrifugal force, etc.), and/or other means by which to hold the components of a CCM firmly in place during the assembly and/or curing step, but that may subsequently permit their removal.

In an embodiment, one mirror of the CCM may be held stationary, while the other two are adjusted until they are both perpendicular to each other, and also perpendicular to the stationary mirror. The apparatus is configured so as to facilitate adjoining of the components of the CCM, including supporting members, while they are still held in the apparatus. In addition, the use of an appropriate adhesive may provide good bonding, while reducing the expansion and/or contraction that some adhesives may exhibit. The apparatus is also configured to facilitate observation and/or adjustment of the angular relationship of the mirrors with one another, even as the adhesive cures, in order to adjust for any possible change in alignment during the adhesive curing step.

The jig is provided with apertures that facilitate the placement of adhesive and/or supporting members, so that certain portions of the mirrors can be attached together with the supporting members, even while still in the jig. The mirror assembly may remain held in the jig as the adhesive cures. In addition, the alignment of the mirrors may be monitored as described above, and the alignment may continue to be adjusted to compensate for any change in the alignment that may occur as the adhesive cures. The CCM may then be removed from the jig and, if desired, additional portions of the supporting members may be adhered to the CCM to fortify the overall assembly.

Figure 1B:
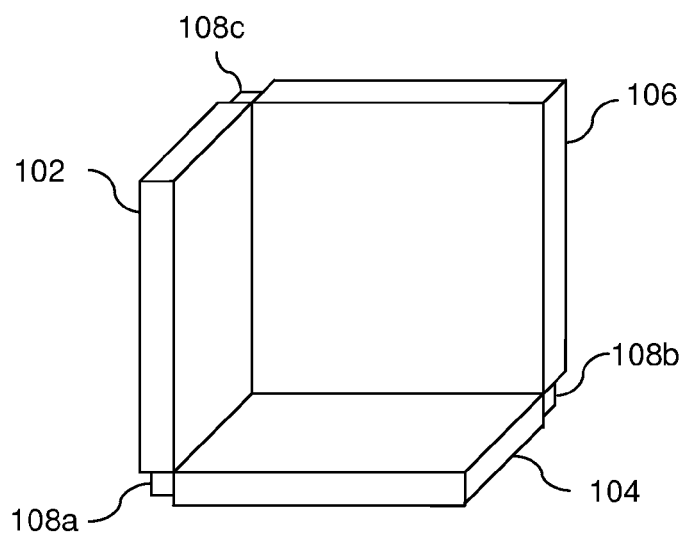
FIG. 1B is a perspective view of a corner cube mirror assembly, according to an embodiment of the disclosure.
Figure 1C:
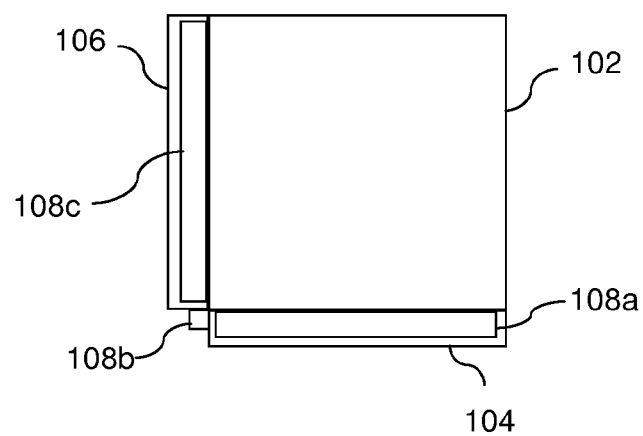
FIG. 1C is a back view of a corner mirror assembly, according to an embodiment of the disclosure.

Turning now to FIG. 1A, a CCM 100 is illustrated. The CCM 100 comprises a first mirror 102, a second mirror 104, a third mirror 106, and may further comprise a plurality of supporting members 108a-108c (only supporting member 108a shown in FIG. 1A). In an embodiment, first mirror 102 may be attached at one of its edges to an edge of second mirror 104 with the aid of the supporting member 108a. For example, and as shown in FIG. 1A-1C, first mirror 102 and second mirror 104 may be arranged such that the reflective surfaces (e.g. the faces) of first mirror 102 and second mirror 104 are toward each other, and aligned such that the faces abut one another, and such that an edge of each of first mirror 102 and second mirror 104 are near one another. In this configuration, the supporting member 108a may be arranged to fit against the edges of both first mirror 102 and second mirror 104. Arranged accordingly, one side of supporting member 108a is in contact with first mirror 102, and another side of supporting member 108a is in contact with second mirror 104, as shown in FIG. 1A-1C. In addition, third mirror 106 may likewise be arranged such that it is perpendicular to both first mirror 102 and second mirror 104. As in the earlier description, an additional supporting member 108b may be arranged to make contact with the edges of second mirror 104 and third mirror 106, as shown in FIG. 1C, below. Yet another supporting member 108c may be arranged to similarly be in contact with first mirror 102 and third mirror 106, as shown in FIG. 1B.

FIG. 1B illustrates a perspective view of the CCM 100, in which the relative placement and orientation of first mirror 102, second mirror 104, and third mirror 106 is shown, and all three of the supporting members 108a-108c can be seen at the junctures of each of the mirrors. As in FIG. 1A, first mirror 102 may be arranged proximate to and perpendicular to second mirror 104 such that the faces of each mirror are toward each other. The supporting member 108a may be arranged to contact edges of first mirror 102 and second mirror 104. Likewise, third mirror 106 may be arranged proximate to and perpendicular to both first mirror 102 and second mirror 104, and supporting members 108c may be arranged in accordance with the previous description, such that it is in contact with an edge of first mirror 102 and third mirror 106. Another of the supporting members 108b may be arranged to be in contact with another edge of third mirror 106 and an edge of second mirror 104. In this manner, by utilizing the supporting members 108a-108c, enhanced contact area between each of first mirror 102, second mirror 104, and third mirror 106 may be provided in order to facilitate bonding of the individual components with a suitable adhesive. Adhesive may be applied in an appropriate manner so as to adhere the components of the CCM 100 with the aid of the supporting members 108a-108c at the points of contact between first mirror 102, second mirror 104, and third mirror 106.

In another embodiment, the surface of the substrates of first mirror 102, second mirror 104, and/or third mirror 106 may be provided with a portion, such as a portion of an edge, or a portion of a face, that does not comprise a reflective surface, reflective material, or other coating or layer. In an embodiment, there may be provided a strip or section on the face of first mirror 102, second mirror 104, and third mirror 106 that may provide an area for adhering an adjacent mirror onto its face, without obscuring any reflective surfaces. For example, first mirror 102, second mirror 104, and/or third mirror 106 may each have a narrow strip on their respective faces, such as about the width of the edges of the substrates of first mirror 102, second mirror 104, and third mirror 106, without any reflective surface thereon. In this manner, for example, second mirror 104 could be placed onto the face of first mirror 102, on the portion of first mirror 102 that does not comprise a reflective surface, and may be adhered thereon. Likewise, third mirror 106 may be arranged so as to sit on the non-reflective portion of second mirror 104, and may further be arranged to enable first mirror 102 to rest on the non-reflective portion of third mirror 106. In this way, each of first mirror 102, second mirror 104, and third mirror 106 may be adhered onto the face of the respective adjacent mirror, without imposing on the reflective surface of the respective adjacent mirror. This configuration may provide additional strength and/or rigidity.

Functionality of corner cube mirror assemblies, such as CCM 100, may depend on the alignment of first mirror 102, second mirror 104, and third mirror 106 of the assembly. A retroflector application may call for accurate, precise alignment of first mirror 102, second mirror 104, and third mirror 106 such that they are perpendicular to each other. The mirrors may be on the order of about 324,000 arc-seconds (e.g. about 90°) with respect to the angles between each of the three mirrors of the assembly. For example, first mirror 102 may be at an angle of about 324,000 arc-seconds in relation to second mirror 104, and third mirror 106 may be at an angle of about 324,000 arc-seconds in relation to both first mirror 102 and second mirror 104. In an embodiment, an accuracy of about +/−1 arc-second, about +/−5 arc-seconds, about +/−10 arc-seconds, about +/−30 arc-seconds, or other measure of accuracy, as respects the angles between each of first mirror 102, second mirror 104, and third mirror 106 of the CCM 100, may be called for in order to provide appropriate retroreflection for a given application. In units of degrees, accuracies of about 0.00028°, about 0.0014°, about 0.0028°, about 0.0083°, or other level of accuracy may be called for, as deemed appropriate in a given embodiment of the present disclosure.

In an embodiment, the substrate portion of first mirror 102, second mirror 104, and third mirror 106 may be of a variety of materials such as glass or glass-like material, including for example borosilicate, fused silica, soda-lime, silicon dioxide, aluminum oxynitride, or other suitable glass material. Alternatively, the substrate may be formed of a polymeric glass (e.g. acrylic) including but not limited to polymethylmethacrylate (PMMA), polycarbonate, or other such synthetic glass or glass-like material. The substrate portion of first mirror 102, second mirror 104, and third mirror 106 may also be formed of a metallic material such as aluminum, gold, platinum, silver, or other metal or alloy of two or more metals. In an embodiment, the substrate portion of first mirror 102, second mirror 104, and third mirror 106 may be of any material suitable for a given application. With any of the materials of construction of first mirror 102, second mirror 104, and third mirror 106, the faces may be optically flat.

In an embodiment, the substrate of first mirror 102, second mirror 104, and third mirror 106 may have one or more coating or layer deposited onto the mirror faces to facilitate or enhance the reflective properties of the substrate. The coatings may be, for example, aluminum, chromium, titanium, gold, palladium, silver, platinum, or other suitable material. The reflective surface may be deposited onto the face of the substrate electrochemically, by vacuum deposition, by chemical vapor deposition such as the reduction of silver nitrate, by plasma vapor deposition (PVD), evaporation, sputtering, or other suitable method of coating and/or plating onto the substrate.

The surface of the mirrors and/or coatings thereon may also be polished, either mechanically, chemically, by chemical-mechanical polishing, or by other means of polishing and/or smoothing of the substrate and/or the layer or layers to further enhance the reflective properties of the substrate. Alternatively, other methods of depositing or plating may be employed in order to provide a suitably reflective layer or surface on the substrates of first mirror 102, second mirror 104, and third mirror 106 of the present disclosure. In an embodiment, all or a portion of the face of first mirror 102, second mirror 104, and third mirror 106 may comprise a reflective surface.

In addition to coatings that may be applied to the substrate to enhance reflection, an additional coating or coatings may be applied as, for example, a protective layer over the reflective surface or coating, or onto the substrate itself, if no additional reflective coatings have been applied thereon. The protective coatings may be, for example, magnesium fluoride, silicon monoxide, calcium fluoride, or other suitable coating that may provide protection from scratching, corrosion, erosion, environmental elements, and/or other factors that might degrade and/or otherwise adversely affect the reflective properties or performance of the substrate and/or layers or coatings deposited thereon.

It may be desirable for the protective coating to be optically transparent, in order to reduce the effect on the reflective surface. Alternatively, a protective coating may have desirable optical properties that may enhance or otherwise affect the optical properties of the incident or reflected light of first mirror 102, second mirror 104, and third mirror 106. For example, a coating or layer may be applied onto the reflective surface of one or more of the mirrors that selectively reflects, refracts, or absorbs one or more wavelengths of light, in a given application. In an embodiment, the substrates of first mirror 102, second mirror 104, and third mirror 106 and any coatings or layers applied thereon may be of any suitable materials that meet the requirements of a particular application of the CCM 100 and/or related assemblies thereof.

The supporting members 108 may be of the same or similar material as the substrate, and may have a variety of cross-sectional shapes such as square, rectangular, triangular, octagonal, spherical, or other shape that suits a given application of the CCM 100. Any/all dimensions of the supporting members 108 may vary, according to the requirements of a given embodiment. In addition, surfaces of the supporting members 108 and/or edges of first mirror 102, second mirror 104, and/or third mirror 106 may be porous or may be rendered porous so as to facilitate or enhance adhesive attachment of the components. For example, some of the surfaces of the substrates of first mirror 102, second mirror 104, and third mirror 106 and the supporting members 108 may be sandblasted or chemically etched to provide a surface that more readily adheres, in conjunction with an adhesive, to the contact surfaces of the components of the CCM 100. In this way, the attachment may be enhanced, which may improve the overall strength, stability, and/or robustness of the CCM 100. Alternatively, surfaces of supporting members 108 and edges of first mirror 102, second mirror 104, and/or third mirror 106 may be polished, smoothed, or provided with other surface treatments as may fit a particular desire or application.

The supporting members may be attached to the CCM 100 with an appropriate adhesive (e.g. one that provides sufficient adhesion, while concurrently reducing the volume change of the adhesive that may occur as it cures). For instance, one or more of a variety of cyanoacrylate adhesives may provide desirable adhesive properties. Cyanoacrylate adhesives, such as the commercially-available adhesive SUPER GLUE (available from the Super Glue Corporation), may provide good adhesion properties, and may undergo less shrinkage than some other adhesives may experience during and subsequent to the curing process.

Some epoxy adhesives may undergo substantial volume changes during and after curing. This volume change, either expansion or contraction, may continue to occur over a prolonged period after the epoxy has initially set, and may cause distortion of the CCM 100, which may adversely effect the performance of the CCM 100. However, some glass-filled epoxies may exhibit less volume change than non glass-filled epoxies, and may therefore provide strong adhesion and volume stability. In an embodiment, a glass-filled epoxy such as TORR SEAL LOW VAPOR PRESSURE RESIN SEALANT (available from Varian, Inc.) may be used to attach the components of the assembly 100.

In another embodiment, one or more of a variety of polyurethane adhesives may be employed in the construction of the CCM 100. While some polyurethane adhesives may have considerable volume change characteristics, given the teachings of the disclosure that comprehend adjustments to the components of the CCM 100 during the curing of the adhesive, a suitable polyurethane adhesive may be used. In an embodiment, any suitable adhesive that exhibits appropriate characteristics for a given application may be used.

FIG. 1C illustrates a back view of a CCM 100. In an embodiment, the supporting members 108 may be of a variety of sizes and shapes, in any of three dimensions, and may be chosen to improve the contact area between the three mirrors of the CCM 100 to provide enhanced adhesion, structural support and/or facilitate alignment of first mirror 102, second mirror 104, and third mirror 106. In an embodiment, attachment of first mirror 102, second mirror 104, and third mirror 106 may be achieved by using any number of supporting members 108, in any size and/or shape, as may be suitable for a given application.

FIG. 2A illustrates a front view of an adjuster 200 of an embodiment of the present disclosure. The adjuster 200 comprises a base plate 210, a movable plate 211, knobs 212, and a portal 220. In an embodiment, the adjuster 200 may be a tilt-stage platform from Edmund Optics, such as part number NT55-459, or similar, and may be configured such that rotating the knobs 212 may change the tilt of the movable plate 211, with respect to the base plate 210. The portal 220 may be configured as will be described, below. In an embodiment, a positioning lip 230 may be provided, in order to facilitate initial positioning of a mirror of the CCM 100 for subsequent alignment and assembly with the remaining components of the CCM 100.

FIG. 2B is a side view of the adjuster 200, and illustrates another view of the components described in the discussion of FIG. 2A, including the base plate 210, the movable plate 211, the knobs 212, the portal 220, and the positioning lip 230.

FIG. 2C is a perspective view of the adjuster 200, and illustrates another view of the components described in the discussion of FIG. 2A and FIG. 2B, including the base plate 210, the movable plate 211, the knobs 212, the portal 220, and the positioning lip 230.

Figure 3A:
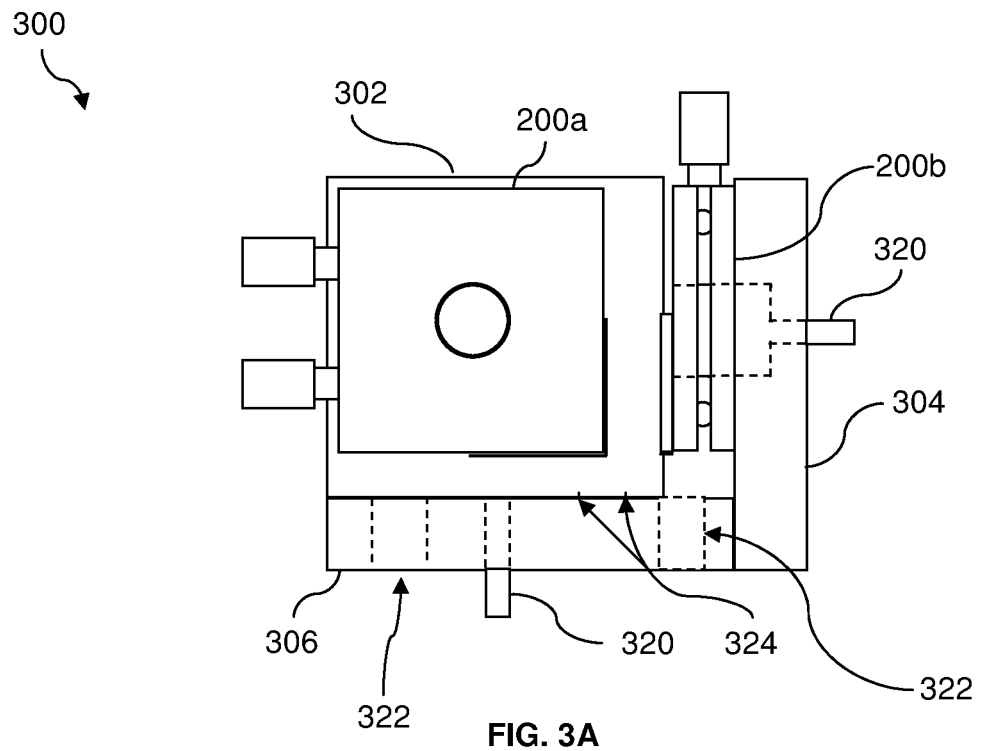
FIG. 3A is a front view of a fixture, according to an embodiment of the disclosure.

FIG. 3A illustrates a fixture 300 of an embodiment of the present disclosure. The fixture 300 may provide the ability to hold and align the components of the CCM 100 for assembly. The fixture 300 comprises a first plate 302, a second plate 304, a third plate 306, and two adjusters 200, hereinafter designated as adjuster 200a and adjuster 200b, for the sake of clarity. The fixture 300 further comprises ports 320, and may comprise positioning pins 324. The ports 320 may be provided on each of the plates 302, 304, 306. In an arrangement similar to that described above for the CCM 100, the three plates 302, 304, 306 of the fixture 300 may be arranged substantially normal to one another, and may be attached in an appropriate manner so as to form an assembled unit as illustrated in FIG. 3A. Attachment may be by welding, gluing, drilling/tapping/fastening with screws and/or bolts, or otherwise adjoining the plates 302, 304, 306 together at about normal angles to one another, as shown in FIG. 3A.

In an embodiment, the ports 320 may facilitate connection of a source of vacuum that may draw air in through the back of the plate 306 and through the adjusters 200a, 200b via the plates 302, 304, respectively. This vacuum may thereby facilitate temporary, secure placement of any of first mirror 102, second mirror 104, and third mirror 106 of the CCM 100 onto the fixture 300 for alignment and assembly. In an embodiment, tubing, nipples, adapters, or other such fitments (not shown) may be employed to facilitate airflow through the holes of the adjusters 200a, 200b in order to provide vacuum from ports 320 to the faces of the adjusters 200a, 200b. In addition, as an option, fixture 300 may be provided with additional fixtures such as positioning pins 324 or other alignment aids to, for example, aid in preliminary positioning of a component or components of the CCM 100, prior to subsequent adjustment and alignment. The fixture 300 may also be configured with tabs, mounts, latches, and/or other fitments to facilitate secure-but-temporary holding of the components of the CCM 100 to the fixture 300 during assembly.

Figure 3B:
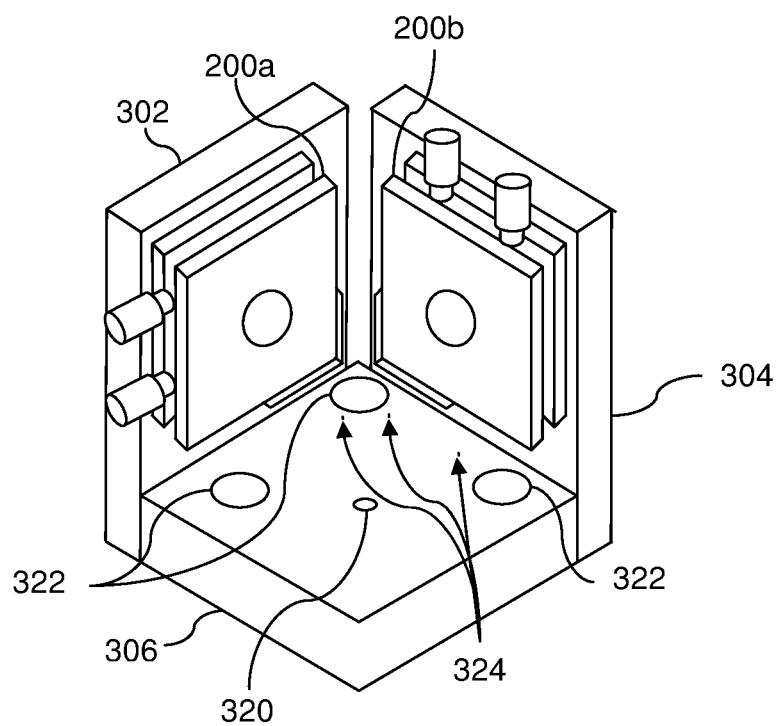
FIG. 3B is a perspective view of a fixture, according to an embodiment of the disclosure.

FIG. 3B is a perspective view of the fixture 300, and comprises the components in the description of FIG. 3A, and in addition illustrates apertures 322. Note that the orientation of the adjusters 200a, 200b are rotated 90°, with respect to one another—the orientation of the adjusters 200a, 200b may be arranged so as to fit a particular application appropriately, and may be arranged to facilitate ease of access to the knobs 212, or for any other considerations as may be indicated by a given situation.

In an embodiment of the present disclosure, a process of assembling a CCM will now be described. The fixture 300 may be secured in an appropriate holder of any form that may stabilize the fixture 300 and facilitate attachment of a source of vacuum to the ports 320, and also facilitate operation of the knobs 212, while maintaining the stability of the fixture 300. For example, the fixture 300 may be clamped in a vice, or otherwise secured. A vacuum source or sources may then be connected to the ports 320 and first mirror 102 may be placed against the face of the adjuster 200a, and arranged so as to fit into the positioning lip 230 of the adjuster 200a. Ambient pressure may then hold first mirror 102 securely against the movable plate 211 of the adjuster 200a, as facilitated by the vacuum drawing against the back of first mirror 102. Second mirror 104 may then likewise be positioned on the face of the adjuster 200b, fitted into the positioning lip 230 on the adjuster 200b, and similarly held in place by ambient pressure, as facilitated by the vacuum drawing against the back of second mirror 104. Third mirror 106 may then be placed onto the plate 306, and positioned with a corner of third mirror 106 against the positioning pins 324 to provide initial alignment, with respect to first mirror 102, and second mirror 104. In this arrangement, the positions of first mirror 102, second mirror 104, and/or third mirror 106 is such that they may be held securely, with the appropriate edges of the respective mirrors aligned with and proximate to the adjacent mirrors of the assembly as described in the previous discussion of the CCM 100, as depicted in FIG. 1A, FIG. 1B, and FIG. 1C. The apertures 322 in the fixture 300 may facilitate access to the back edges of first mirror 102, second mirror 104, and third mirror 106 when they are in place as described herein, and may facilitate the attachment of the supporting members 108 in the appropriate locations, as previously described. The angular relationship between each of first mirror 102, second mirror 104, and third mirror 106 may then be adjusted by turning knobs 212 and measuring or monitoring the angular relationship.

In an embodiment, the components of the fixture 300 may be attached to one another, either temporarily or permanently, or may otherwise be disposed or configured in proximity to one another by any means or manner that provides appropriate support for and/or alignment of the components of the CCM 100 before, during and/or after the assembly process. In addition, any viable means of suspending, holding, affixing, and/or otherwise positioning of the components of the CCM 100 may be employed as an embodiment of the present disclosure.

The angular relationship of first mirror 102, second mirror 104, and third mirror 106 may be measured by any means suitable to facilitate sufficiently accurate and precise alignment as called for by the application for which the final product CCM 100 is intended. In an embodiment of the disclosure, a wavefront analyzer (not shown) may be arranged to project an image onto the faces of first mirror 102, second mirror 104, and third mirror 106 as they are held in place in the fixture 300. The wavefront analyzer may then monitor the image reflected back from the faces of first mirror 102, second mirror 104, and third mirror 106. Those of skill in the art will realize that the image observed by the monitor of the reflected image of the wavefront analyzer may appear as a set of concentric rings of varying diameter and may therefore resemble, for example, a bulls-eye figure. One skilled in the art may also realize that by adjusting the angular relationship between first mirror 102, second mirror 104, and third mirror 106 by, for instance, turning the knobs 212, the concentric rings of the reflected image may change, with respect to the shape and/or relative position of the rings. By adjusting first mirror 102, second mirror 104, and/or third mirror 106 with the knobs 212 and observing the appearance of the concentric rings, the angular relationship of first mirror 102, second mirror 104, and third mirror 106 can be brought into alignment so as to provide the appropriate configuration required for a particular application of the CCM 100. For instance, the respective angles between each of first mirror 102, second mirror 104, and third mirror 106 may be adjusted to 324,000 arc-seconds+/−1 arc-second, or other measure of accuracy as deemed appropriate by a given application of the CCM 100.

In an embodiment, the components of the CCM 100 may be adjusted as the adhesive cures. Without wishing to be limited by theory, some adhesives may expand or contract as they cure. This expansion and/or contraction may cause deformation of the structure and/or components of the CCM 100, which may result in inaccuracies with respect to the angles between first mirror 102, second mirror 104, and third mirror 106. In order to compensate for this movement, the adjustable stages may be continuously and/or occasionally adjusted, as the adhesive cures. In this manner, the resultant CCM 100 may have improved accuracy of the angular relationships between first mirror 102, second mirror 104, and/or third mirror 106 of the CCM 100.

In an embodiment, fixture 300 may be arranged in an inverted configuration, such that the faces of the plates 302, 304, 306 are pointed downward. In this configuration, the component mirrors 102, 104, 106 may be held in place by a suitable force, such as by vacuum as described above, and the wavefront analyzer (not shown) may project an image upward, onto the faces of first mirror 102, second mirror 104, and third mirror 106 in order to facilitate alignment and assembly of the CCM 100. In an embodiment, the components of CCM 100 may be held and/or observed at or from any suitable angle for a given application or desire.

Figure 4:
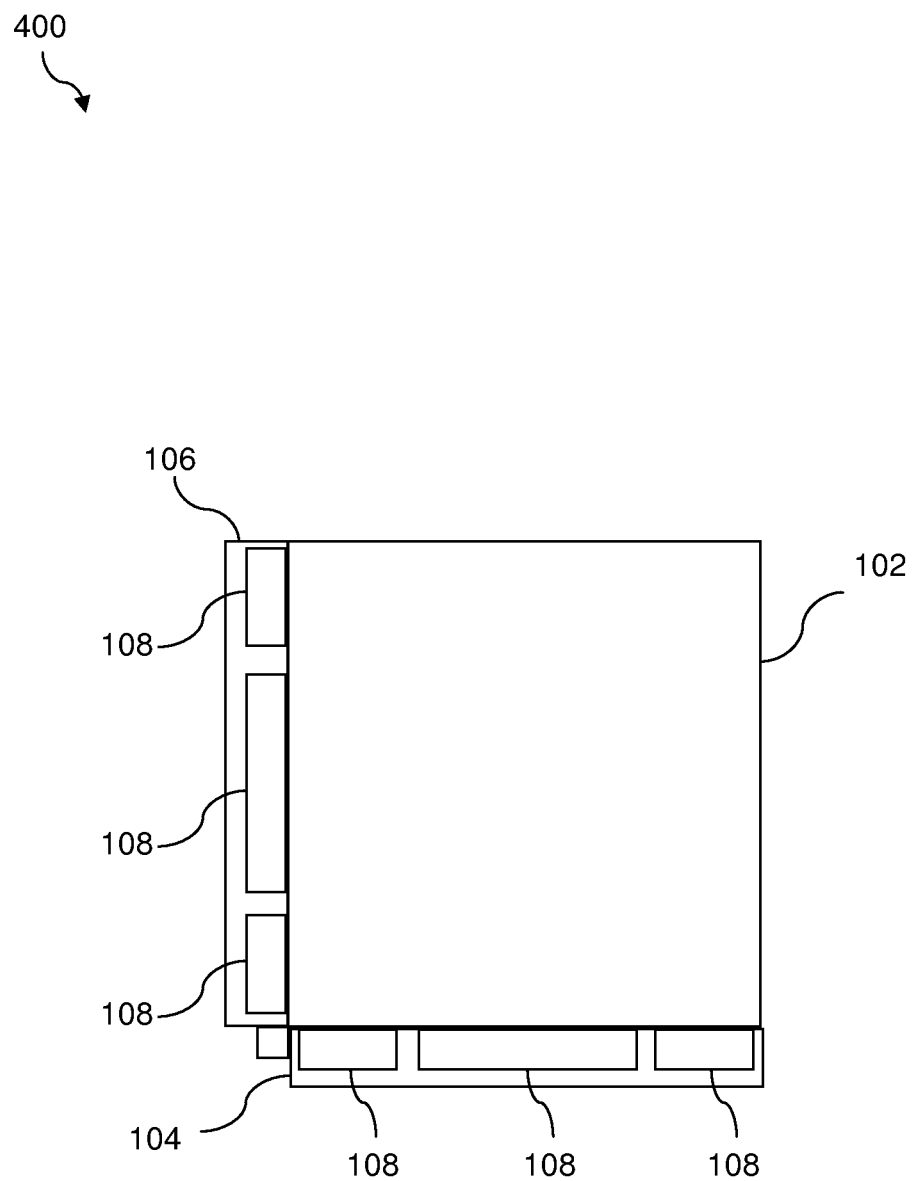
FIG. 4 is a back view of a corner cube mirror assembly, according to an embodiment of the disclosure.

FIG. 4 is a back view of an embodiment of a CCM 400 of the disclosure. The CCM 400 is similar to the CCM 100, and comprises first mirror 102, second mirror 104, and third mirror 106. In addition to first mirror 102, second mirror 104, and third mirror 106, CCM 400 comprises additional supporting members 108. In the present embodiment, assembly of the CCM 400 may be facilitated by employing small pieces of the supporting member 108. During the assembly process, small pieces of the supporting member 108 may be held with, for instance, tweezers or small pliers. An appropriate adhesive may be applied to the supporting member 108, the edges of first mirror 102, second mirror 104, and/or third mirror 106 to be assembled, and/or both. The supporting member 108 may then be attached in the appropriate location by passing it through the apertures of the fixture 300 and placing it onto the edges of first mirror 102, second mirror 104, and third mirror 106. This can be repeated at the edges near the point at which first mirror 102, second mirror 104, and third mirror 106 converge, as well as at the outer edges of the junctions of first mirror 102, second mirror 104, and third mirror 106, via the respective apertures, as needed.

In an embodiment, the corner cube mirror 400 may be held in place in the fixture 300 for an appropriate amount of time while the adhesive cures. Curing of the adhesive may be improved or brought about more quickly by application of light of a given wavelength, curing accelerants, heat, or other method or means of speeding the curing process. The corner cube mirror 400 may then be removed from the fixture 300 and, if appropriate, additional supporting members 108 may be adhered in between the already-present supporting members 108, or in any location that may facilitate enhancement of the CCM 400. Any means of attaching, adhering, affixing, bonding, or otherwise adjoining the components of the CCM 400 may be employed in an embodiment of the present disclosure.

In an embodiment, the first pieces of the supporting members 108 to be attached to the CCM 400 may be smaller in length than those that may be attached subsequent to the removal of the CCM 400 from the fixture 300, so as to facilitate their passage through the apertures 322. For instance, the smaller pieces of the supporting members 108 that are attached via the apertures 322 may be shorter than about 50% of the length of the edges of first mirror 102, second mirror 104, and/or third mirror 106. Conversely, once the CCM 400 is removed from the fixture 300, additional pieces of the supporting members 108 that may be adhered between the smaller supporting members 108 may be longer, as an application calls for, and may provide additional strength of the CCM 400. For example, the longer pieces of the supporting members 108 may be longer than about 50% of the length of the edges of first mirror 102, second mirror 104, and third mirror 106. In an embodiment, any size, shape, length, geometry, quantity, or configuration of supporting members 108 may be employed to facilitate or enhance the assembly process, the structural integrity, the robustness, and/or the alignment of the CCM 400. In an embodiment, any suitable adhesive, bonding agent, attachment method, or medium may also be employed in the attachment process of the components of the CCM 400.

FIG. 5 illustrates several views of embodiments of a CCM 500, of the disclosure. FIG. 5a is a side view of two adjacent mirrors, mirror 502 and mirror 504 of the CCM 500, with a supporting member 506. In this embodiment, mirror 502 and mirror 504 do not overlap. That is to say, the substrate of mirror 502 does not rest on the face of mirror 504.

Similarly, the substrate of mirror 504 does not rest on the face of mirror 502. In this configuration, the contact area between mirror 502 and mirror 504 is reduced, and adhering them one to another without the benefit of supporting member 506 may result in a structure with reduced structural strength and/or rigidity. As one of skill in the art may realize, adhering supporting member 506 in an arrangement such that it is along the edges of both mirror 502 and mirror 504 may provide increased contact area between the two mirrors. This increased contact area, when properly adhered to each of mirror 502 and mirror 504, may provide additional strength, rigidity, and/or structural stability for mirror 502 and mirror 504. This process may be repeated with respect to an additional mirror (not shown) to form the final product mirror assembly such as CCM 500.

In addition to the increased contact area, supporting member 506 may provide rigidity and/or structural stability to the assembly of mirrors mirror 502 and mirror 504. Not wishing to be limited by theory, in this arrangement, supporting member 506 may act as a bracing component for the mirror assembly. As one of skill in the art may appreciate, this bracing effect may derive from the lever-like nature of the placement of supporting member 506. Taking this a step further, adjoining a third mirror (not shown) as described herein above, with the same supporting member arrangement and configuration, may yield a CCM 500 with improved structural properties, which may in turn provide robustness, accuracy, and precision of the final CCM 500.

FIG. 5b illustrates another embodiment of the disclosure. In this embodiment, mirror 504 overlaps a portion of the reflective surface of mirror 502. As shown, mirror 504 rests partially on the face of mirror 502, yet is left partially hanging off of the face of mirror 502. The portion that is not positioned directly onto the face of mirror 502 is affixed to the supporting member 506, which is likewise affixed to the edge of mirror 502. In this configuration, the interface between mirrors mirror 502 and mirror 504 is augmented by the addition of the contact area between them that is provided by the supporting member 506. In addition to the additional contact area between mirrors mirror 502 and mirror 504, supporting member 506 may also provide added strength by virtue of the leverage it adds, as described above.

In yet another embodiment of the disclosure, FIG. 5c shows mirror 504 arranged such that its edge is completely resting on the face of mirror 502. As can be seen in FIG. 5c, the supporting member 506 is arranged below mirror 504, and is attached to the face of mirror 502, and to the substrate of mirror 504, to add additional contact area and leverage for improved strength and/or rigidity of the CCM 500.

As may be appropriate in the embodiments illustrated in FIGS. 5b and 5c, the portion of the mirror 502 onto which mirror 504 is to be placed may be suitably prepared to accept adhesion of mirror 504 onto mirror 502, such as by sandblasting, etching, or otherwise preparing the face of mirror 502, as previously described herein above.

While FIG. 5 illustrates the attachment of two mirrors, it is to be understood that this is an example of the process of assembling a CCM 500 as in CCM 500, and only describes the attachment of the first two mirrors of the three-mirror CCM 500, but should not be taken as limiting the disclosure. FIG. 5 is only provided as an example of additional embodiments of the disclosure that may provide improvements to some of the embodiments described herein.

Figure 6:
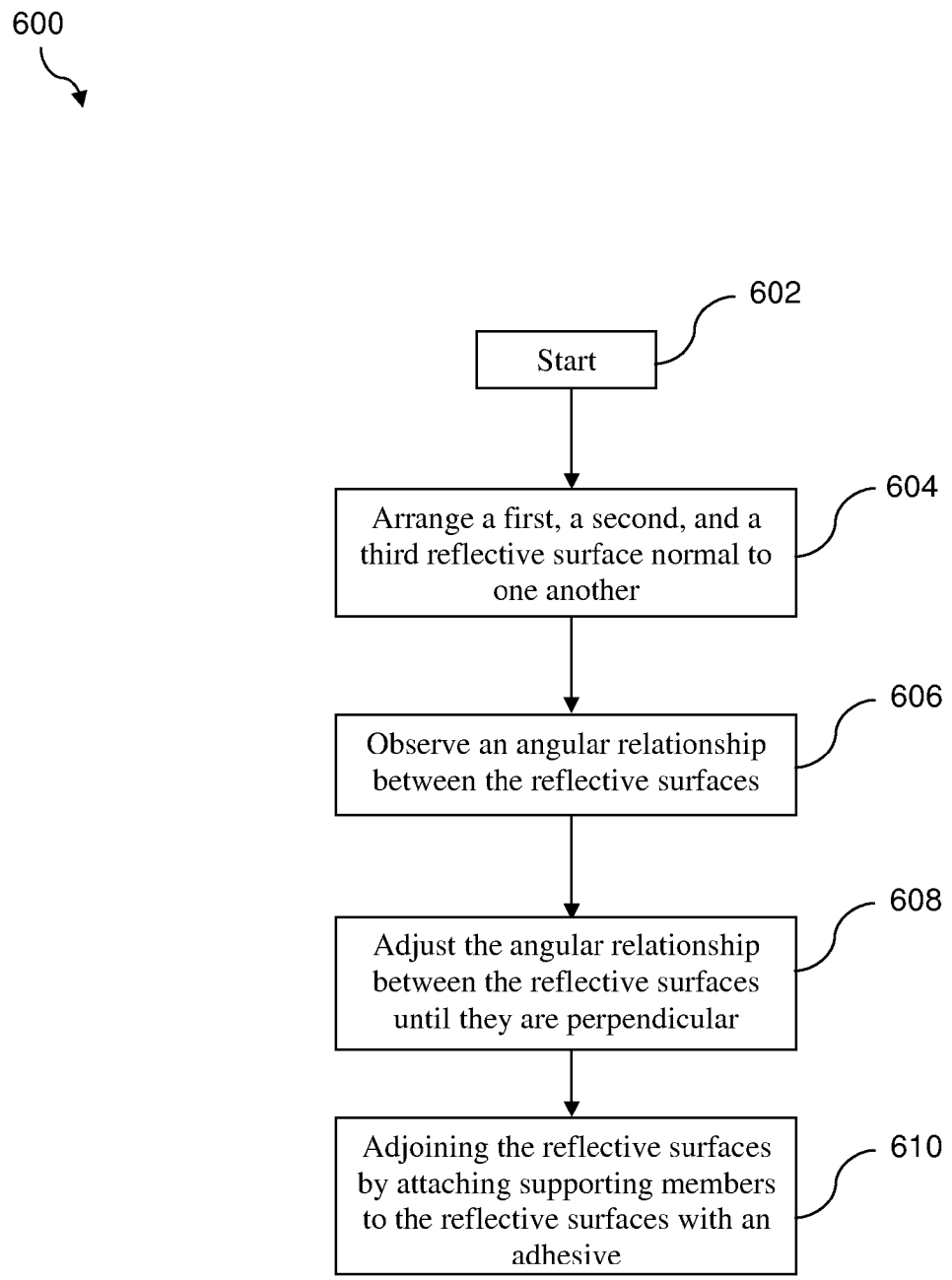
FIG. 6 illustrates a flowchart representative of an embodiment of the disclosure.

Turning now to FIG. 6, a method 600 is illustrated. In step 602, assembling a CCM 100 starts. In step 604, a first, a second, and a third reflective surface are arranged normal to one another. In this step, as previously described, an alignment apparatus my be employed to hold and align the components of CCM 100, during assembly.

In step 606, the angular relationship between the reflective surfaces is observed. For example, a wavefront analyzer may impose an image onto the surfaces of the CCM 100. The image reflected off of the reflective surfaces of the CCM 100 may be observed to, for example, ascertain the degree of perpendicularity of the angles between each of the reflective surfaces of the CCM 100.

In step 608, the angular relationship of the reflective surfaces may be adjusted by, for example, manipulating the knobs of adjusters, as described herein above. As described herein above, a wavefront analyzer or similar device may project an image onto the reflective surfaces of CCM 100, and the reflected image monitored to facilitate alignment of the components of CCM 100.

In step 610, the reflective surfaces are adjoined by attaching supporting members to the reflective surfaces with an adhesive, as described herein above. For example, supporting members may be coated with an adhesive, passed through apertures in the alignment apparatus, and adhered to edges of the substrates of the reflective surfaces of the component mirrors of CCM 100.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other examples of changes, substitutions, and alterations are ascertainable by one skilled in the art and could be made without departing from the spirit and scope disclosed herein.

What is claimed is:

1. An apparatus for assembling a retroreflective device comprising:
    a first plate, a second plate, and a third plate, each with a face, each of which is adjoined substantially perpendicular to each of the other plates, wherein the faces of the plates are substantially normal to each other;
    a first alignment device coupled to the face of the first plate, the first alignment device further comprising a first adjustable plate that is substantially parallel to the face of the first plate and movably coupled to the first plate, the first adjustable plate being adjustable with respect to an angular relationship with the second plate and the third plate;
    a second alignment device coupled to the face of the second plate, the second alignment device further comprising a second adjustable plate that is substantially parallel to the face of the second plate and movably coupled to the second plate, the second adjustable plate being adjustable with respect to an angular relationship with the first plate and the third plate;
    attachment appurtenances on the first alignment device and the second alignment device, the attachment appurtenances configured to hold components of the retroreflective device onto the alignment devices while assembling the components of the retroreflective device; and
    apertures provided in one or more of the first, the second, and the third plates through which portions of the retroreflective device are accessible during the assembling of the retroreflective device, wherein the assembling includes an adhesive curing step.

2. The apparatus of claim 1 wherein the attachment appurtenances are at least one type selected from the group consisting of: an adhesive, a fastener, a clip, a pin, a spring, a tab, and a force.

3. The apparatus of claim 2 wherein the force is at least one selected from a ground of forces consisting of: gravitational, mechanical, centrifugal, and pressure.

4. The apparatus of claim 2 wherein the adhesive is at least one selected from the group consisting of: cyanoacrylate adhesive, polyurethane adhesive, and epoxy adhesive.

5. The apparatus of claim 4 where in the epoxy adhesive is a glass-filled epoxy adhesive.

6. The apparatus of claim 1 wherein adjacent reflective surfaces overlap.

7. The apparatus of claim 1 wherein adjacent reflective surfaces do not overlap.

8. The apparatus of claim 1 wherein the faces of the plates are optically flat.

9. The apparatus of claim 1 wherein perpendicular is defined as being within less than 40 arc-seconds of perpendicular.

* * * * *